Patented Sept. 7, 1948

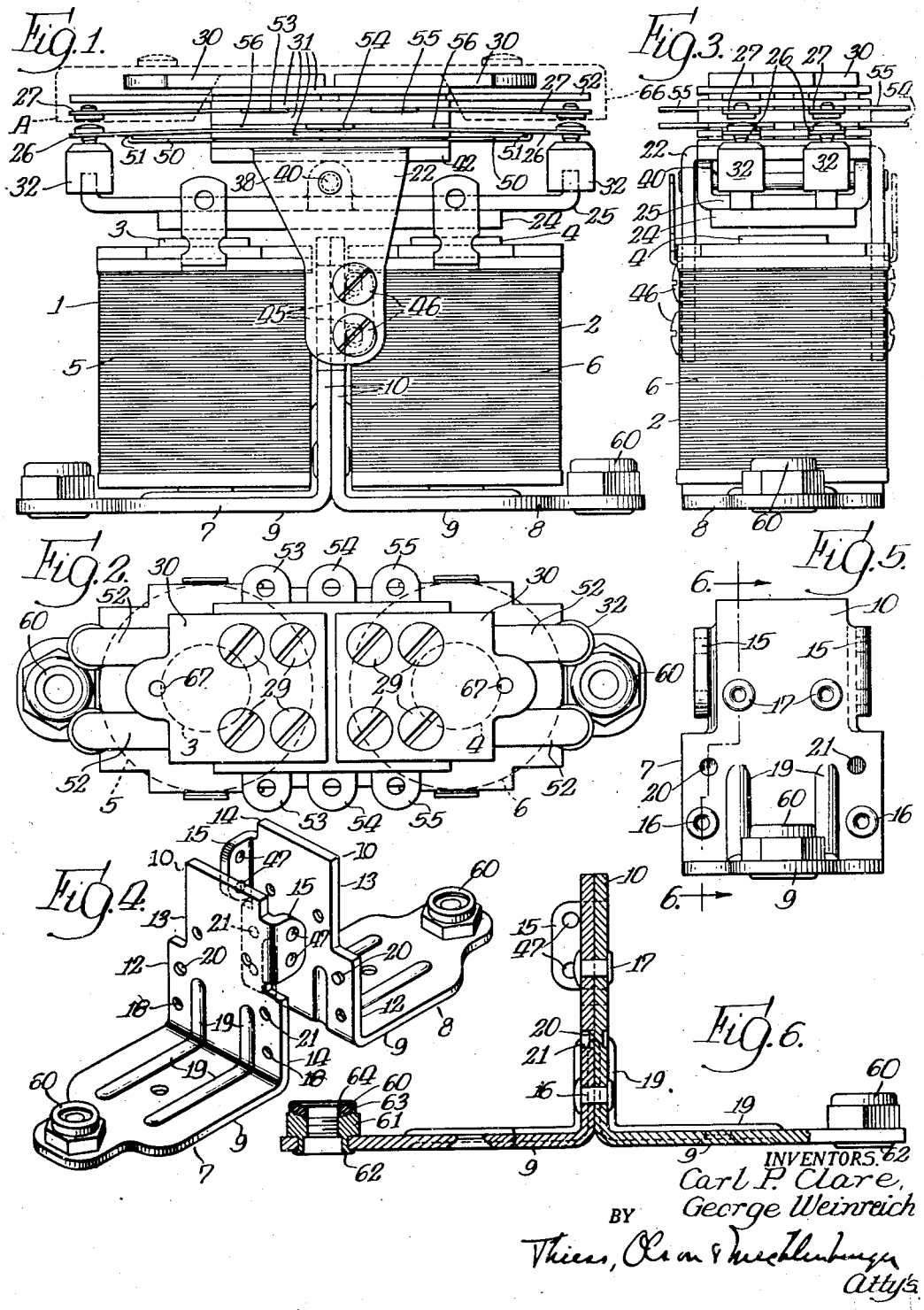

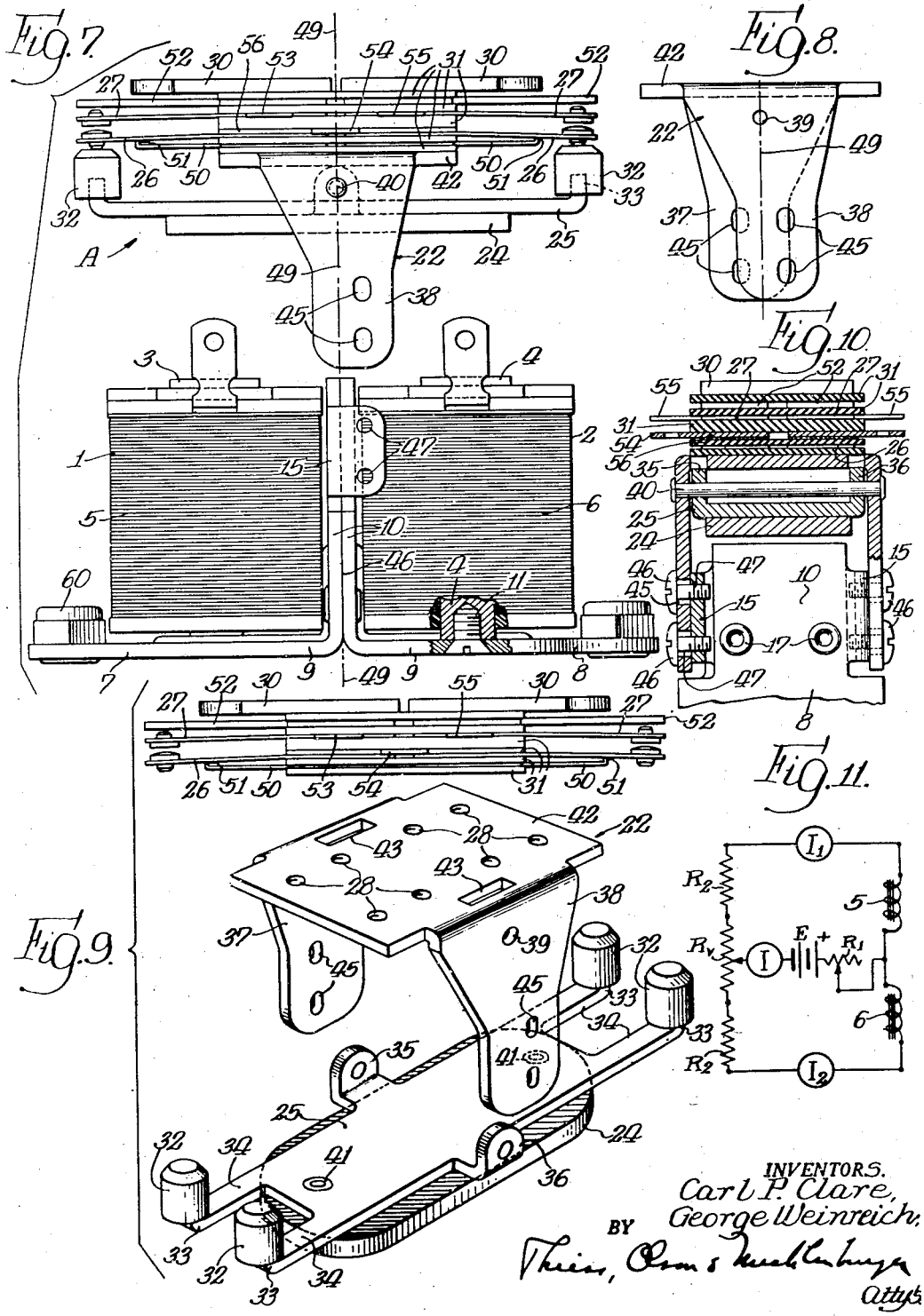

2,448,772

UNITED STATES PATENT OFFICE 2,448,772

DIFFERENTIAL RELAY

Carl P. Clare and George Weinreich, Chicago, Ill., assignors to Cook Electric Company, Chicago, Ill., a corporation of Illinois Application November 26, 1943, Serial No. 511,814

7 Claims. (Cl. 200—98)

This invention relates to an electromagnetic relay and more particularly to a differential relay having a balanced armature.

Although a differential relay is illustrated herein as a preferred embodiment capable of obtaining the advantages and results contemplated from the use of the invention, it will be understood that certain novel features may be used in other types of relays and that the invention need not be limited solely to the type disclosed.

The structure herein illustrated is provided with a pair of coils and an armature which is adapted to be held in a balanced position when current of the same or balancing potential passes through each coil, but which is adapted to be quickly unbalanced to operate a number of work circuits upon variation of the potential in the coils, the structure being so designed that a variation amounting to a small differential in the coils will be effective to disturb the relation holding the armature in its balanced position.

In relays of this type, it is highly desirable for satisfactory operation that the construction be of a character assuring a balance between the coils and the armature that will not be affected by shock or vibration, but will be extremely sensitive to a small change of potential in one coil over the other. In other words, the structure must be of a nature that the armature will not only remain in its balanced position maintained by balancing circuits of magnetic flux through the coils, but will immediately be actuated in either direction by a current change of an extremely small magnitude. This is particularly desirable if these relays are to be employed to actuate control circuits relied upon to sensitively react to slight changes in conditions to be controlled. Relays as heretofore constructed would not be readily sensitive to a variation amounting to small differential in the coils and still be effective to maintain the armature in balanced position, nor were they able to maintain this balance of the armature and still not be affected by shock or vibration.

Accordingly, it is an object of the invention to provide a relay of an improved construction that will reliably perform to keep the armature balanced while a balancing potential passes through the coils and respond instantly to changes in conditions causing a slight differential in potential in the coils and not be readily affected by shock or vibration.

To this end it is an object of the invention to provide a relay of an improved construction that admits of precision manufacture to obtain uniformity in production and assembly of the parts and to provide certain novel structural features designed to overcome the difficulties heretofore experienced.

According to the invention disclosed herein, a relay is contemplated that may be constructed of two coils capable of being balanced and employing heel pieces of identical construction and magnetic characteristics so that they may be assembled in abutting relation and provide a novel form of support for a sub-assembly that pivotally mounts the armature in a position above the cores uniquely providing for a perfect balance thereof by balanced magnetic circuits of both coils as well as a mechanical balance that prevents operation by vibration or shock.

A further feature of the invention is directed to the novel form of pivotal mounting of the armature within a yoke member forming a part of said sub-assembly. The sub-assembly novelly includes contact springs mounted upon but above this yoke. Specifically the armature remains balanced against these contact springs in open position, but it is designed to be attracted to either core of the coils depending upon the change in potential differential to engage and move certain of these spring contacts to circuit-closing position. The arrangement of the pivotal mounting of the armature within the yoke and the mounting of the contact springs thereupon novelly provides for an adjustment by the sub-assembly of the air gaps between the poles of the coils and the armature that will not disturb the set relation between the armature and the contact springs. Moreover this adjustment by the sub-assembly assures uniform adjustment of both air gaps to avoid disturbing the balance of the armature provided by its novel form of pivotal mounting upon said yoke.

The heel pieces are preferably mated and each is preferably formed from the same die and provided with interlocking elements predeterminedly located so that abutting portions may be rigidly connected together in a predetermined relation to assure predetermined magnetic characteristics for each as regards the magnetic circuits in which they are inserted. In this connection, the yoke is formed to distribute equally its mass for each heel portion so as not to allow the same to affect the capacity of each circuit and to assure balancing between the same.

Other objects and advantages of the invention will be apparent from the following detail description when taken in connection with the accompanying drawings which form a part hereof.

In the drawings:

Figure 1 is a side elevation of a relay embodying the invention, the cover protecting the contact springs being illustrated in dotted lines;

Fig. 2 is a top plan view of the relay with the cover omitted;

Fig. 3 is a side elevation of the relay;

Fig. 4 is a perspective view of the heel pieces to illustrate that they are of identical construction or mated, so to speak, and provided with interlocking elements that hold them together in a predetermined relation when the heel pieces are rigidly secured together in abutting position.

Fig. 5 is an end view of these heel pieces secured together;

Fig. 6 is a longitudinal sectional view through the heel pieces;

Fig. 7 is an elevational view of this relay illustrating the sub-assembly carrying the armature and the contact springs and the manner in which the same is mounted upon the vertical portions of the heel pieces disposed between the coils in order to position the pivotal mounting of the armature and be extremely sensitive to potential change in the coils and yet reasonably withstand shock or vibration without disturbing its balanced relation in the magnetic circuits of the two coils;

Fig. 8 is an end view of the yoke comprising the mounting member of the sub-assembly;

Fig. 9 is a composite view of the parts comprising the sub-assembly, to wit, the yoke, the armature and the contact springs, the view illustrating the manner in which these parts may be accordingly assembled to secure uniformity of production;

Fig. 10 is a transverse section on a plane intersecting the pivotal mounting of the armature, the view also illustrating the assembly of the contact springs; and Fig. 11 illustrates one form of circuit in which this relay may be connected with its coils in multiple for receiving an energizing current magnetically to balance the coils and to hold the armature in a balanced position, which circuit is designed to create a small differential of potential between the coils for the purpose of operating certain control circuits when there is a variation in the conditions that are being controlled.

The relay disclosed herein comprises coils 1 and 2 having cores 3 and 4 and windings 5 and 6, respectively. When these windings 5 and 6 are energized, the magnetic circuits of coils 1 and 2 are intended to remain balanced until a variation in the conditions to be controlled causes a slight differential in the current passing through these windings. One possible use of the relay is shown in Fig. 11. Here, the magnetic circuits of coils 1 and 2 will remain balanced, while the pointer of Rv remains in its mid position as shown. However, slight movement of the pointer of Rv in opposite directions will vary the potential in the coils and create an unbalanced magnetic condition.

Heel pieces 7 and 8 of coils 1 and 2 are preferably mated or of identical construction as illustrated in Fig. 4. Each heel piece is provided with a base 9 and a vertical portion 10. Cores 3 and 4 are secured to bases 9 by means of screws 11 as illustrated in Fig. 7. Vertical portions 10 are adapted to abut each other and be disposed between coils 1 and 2 and form with bases 9 a part of the magnetic circuit of each coil.

A novel feature of the invention resides in the construction of heel pieces 7 and 8 with respect to each other. They are preferably made by the same die and are, of course, of the same thickness of material. Accordingly, the mass in each is distributed in the same manner. It will be noted that when heel pieces 7 and 8 are positioned to have their vertical portions 10 face each other the edges 12 with recessed or cut-away portions 13 and edges 14 with fastening ears 15 will be oppositely disposed. In other words, edge 12 of each heel piece will lie opposite to edge 14 of the other heel piece, and ear 15 of each heel piece will lie in the cut-away portion 13 of the opposite heel piece. It will be apparent, moreover, from the illustration in Fig. 4, that each ear 15 will overlap the opposite heel piece in the same manner and provide for equal distribution of the iron mass on opposite sides of these heel pieces.

Heel pieces 7 and 8 are fixedly secured together by a pair of lower rivets 16 on opposite sides of reinforcing ribs 19 formed in bases 9 and vertical portions 10 as illustrated, and by upper rivets 17. In the forming operation of heel pieces 7 and 8, or thereafter, if so desired, rivet openings 18 are provided at predetermined locations so that these openings in each vertical portion 10 will align with the corresponding openings in the other vertical portion when these vertical portions abut each other. To assure accurate alignment of vertical portions 10 during the riveting operation, a guide lug 20 extends outwardly from the inner face of each vertical portion for interlocking registration with openings 21 in the opposite vertical position. In this manner, aligned registration of the vertical portions 10 is assured for the purpose of properly locating ears 15. A yoke 22 pivotally supporting armature 24 above the poles of cores 3 and 4 is carried by ears 15. As to be later explained, yoke 22, armature 24, pivotal mounting bracket 25 and a plurality of contact springs 26 and 27 that may be arranged in pairs for operating a number of control circuits form a novel sub-assembly designated broadly as A. Yoke 22 may although not necessarily be a stamping which assures accurate distribution of mass and accurate forming of the parts thereof. A plurality of openings 28 may be formed in each side as illustrated in Fig. 9 and then tapped to receive a plurality of screws 29 securing said pairs of contact springs 26 and 27 and separating insulators 31 between yoke 22 and clamping plates 30. It will be apparent that the same tools may be used to form similar openings 28 in contact springs 26 and 27 and in separating insulators 31 whereby both will be provided with these openings 28 uniformly spaced to receive said fastening screws 29. In this manner contact springs 26 and 27 will be assembled in predetermined position with respect to each other and also with respect to buttons 32 mounted upon upturned tips 33 of spaced arms 34 extending outwardly of armature bracket 25.

Armature bracket 25 is provided with oppositely disposed upstanding mounting lugs 35 and 36, and yoke 22 is provided with opposed downwardly extending legs 37 and 38, each being provided with an opening 39 to receive the pivot pin 40 carrying lugs 35 and 36 thereon to pivotally position bracket 25 and armature 24 above and midway between the poles of cores 3 and 4. Lugs 35 and 36 are designedly positioned midway of bracket 25 so that there will be an equal distribution of material on opposite sides of the pivotal axis thereof and so that the armature 24 may likewise be secured on opposite sides of this pivotal axis by rivets 41. Rivets 41 may also be located at predetermined equal distances from the pivotal axis in order to assist in securing this equal distribution as well as a mechanical and magnetical balance of the armature. If a close relation of armature bracket 25 is desirable with the flat cross portion 42 of yoke 22, slots 43 may be cut therein to allow lugs 35 and 36 to extend thereinto and still be freely movable upon pivot 40.

The relative formation of downwardly extending legs 37 and 38 of yoke 22 will be noted in Fig. 8. The lower portion of these legs are provided with elongated slots 45 adapted to receive fastening screws 46 shown particularly in Figs. 1 and 10, which extend into tapped openings 47 in the ears 15 of heel pieces 7 and 8. Due to the overlapping relation of these ears 15 with respect to the opposite heel pieces, tapped openings 47 are thus disposed in off center relation with respect to the heel pieces. This requires slots 45 to be off center with respect to the center of yoke 22, it being noted, however, that openings 39 receiving the armature pivot 40 are disposed upon the center line, and hence, the pivotal mounting of the armature 24 is not affected by this off centering of the attachment of each of the legs 37 and 38 upon ears 15 of opposite heel pieces. These legs 37 and 38 are also offset with respect to each other, as noted in Fig. 8. As viewed in Fig. 8, a greater mass of material of leg 38 will extend to the right of the center line of the heel pieces, which line is indicated at 49, while a corresponding amount of greater mass of material of leg 37 is disposed to the left of this center line. The arrangement provides equal distribution on opposite sides of the center line with respect to both of these legs. Thus, the off centering of tapped openings 47 in ears 15 of the heel pieces requires offsetting of the legs 37 and 38 and a similar off centering of the slots 45, thus allowing at the same time to place openings 39 in each leg on said center line 49. Yoke 22 is thereby rigidly held by ears 15 to secure equal distribution, notwithstanding the off centering of ears 15 and the offsetting of legs 37 and 38, this yoke furnishing a pivotal mounting for armature 24 having its axis lying midway of heel pieces 7 and 8.

With contact springs 26 and 27 and separating insulators 31, as well as clamping plates 30, provided with openings that are formed therein in a predetermined relation, the assembly of these parts upon the top portion 42 of yoke 22 by the screws 29 in the manner and relation illustrated in Fig. 10, a sub-assembly designated A is provided that permits accurate mounting of the armature and contact springs as a unit above the poles of the cores of coils 1 and 2. The air gaps between these poles and armature 24 may be readily adjusted by the screws 46, which may be loosened slightly to allow this sub-assembly A to be vertically adjusted upon ears 15. By this simple and single adjustment through these screws 46 riding in elongated slots 45, it is possible to make this air gap adjustment uniformly between the opposite ends of armature 24 and the corresponding poles of cores 3 and 4. It will be noted that this adjustment will not disturb the relation between buttons 32 and contact springs 26 and 27, the adjustment of these parts remaining the same. The structure disclosed herein thereby provides the same adjustment for the air gap of each coil and at the same time prevents the destroying of the adjustment between the actuating buttons 32 and the contact springs 26 and 27.

The number of pairs of contact springs 26 and 27 may be varied according to the requirements of the particular installation embodying the relay disclosed herein. The relay illustrated in the drawings is provided with four pairs of contact springs 26 and 27 with two pairs opposing each other on each side. A lower spring support 50 is provided for each lower contact spring 26 and is held by the aforesaid screws 29, each lower spring support being provided with two openings through which the corresponding screws 29 will pass in order to thread into the tapped openings 28 in the flat portion 42 of yoke 22. Lower contact springs 26 are biased to rest against the upturned tip 51 of lower spring support 50 in order normally to remain spaced from or in open position with respect to upper contact spring 27. There are also provided upper spring supports 52 of somewhat heavier material than the lower spring support 50. Each upper spring support 52 is also provided with openings to receive the corresponding screws 29. Upper contact springs 27 are normally biased away from these upper spring supports 52 so as not to engage the same when not engaged by the lower contact springs 26. However, when armature 24 is tilted about its pivotal mounting 40 caused by a slight current differential in windings 5 and 6 and consequently an attraction of one end of the armature to one of the poles 3 and 4, buttons 32 at the end opposite to the end attracted will swing upwardly to move and engage lower contact springs 26 into circuit closing position with the upper contact springs 27. The control circuits of these contact springs are connected as by the spring terminals 53, 54 and 55 disposed to extend outwardly from opposite sides of the relay. Spring terminals 53 and 55 may be provided for the opposite upper spring contacts 27, while spring terminal 54 may be provided for both of the lower contact springs 26 on opposite sides, there being a plate 56 to which this spring terminal 54 is integrally attached for lying between the adjacent separating insulator 31 and the lower contact springs 26, as illustrated in Figs. 1 and 10.

While various forms of attachments may be used to secure the relay in position, wherever it may be supported, it is desirable to use what is termed an elastic nut 60 carried at the outer end of base portion 9 of each heel piece. These elastic nuts 60 may comprise a threaded nut 61 formed with a lower flange 62 extending through an opening in the base portion and being crimped about the edge to secure the same thereto. An upper flange 63 is also crimped to retain a cushion member 64. Thus, excessive strain can not be imposed upon the heel pieces to cause warping of the parts so as to affect the mechanically as well as magnetically balanced mounting of the armature, or so as to affect its adjusted relation with the contact springs, if the bolts are either unevenly tightened or tightened too much.

The coils 1 and 2 may be constructed in any desirable way to accomplish the results desired. The structure disclosed may be made extremely sensitive to a change of potential. In actual practice, the magnetic balance between the coils has been made to respond to a differential as low as 3 milliamperes so that the armature will be attracted to actuate the contact springs 26 and 27. While it is contemplated that the coils 1 and 2 are substantially identical so that the same flow of magnetic flux occurs in each of the magnetic circuits of the coils as the result of the same current flowing through each of the windings 5 and 6, it is understood that the balancing action of the armature might be obtained by the use of current that is not of the same potential by reason of the construction of the coils, or the difference in the number of turns in the windings. When the term "balancing potential" is used herein, it is therefore understood to include such variation.

From the foregoing description, it will be noted that extending heel pieces 7 and 8 upwardly between the coils 1 and 2 provide a novel form of support and pivotal mounting for the armature 24. Yoke 22 adjustably supported upon these heel pieces provides the means of carrying the armature and the contact springs as a sub-assembly and further provides an adjustment for the air gaps that may be easily made without disturbing the mechanically and magnetically balanced relation which the armature bears to both cores and without disturbing the adjustment of the contact springs either with respect to each other or with respect to the actuators 32 operated by the armature. This adjustment of the parts may be readily retained in the use of the relay, this being further aided by the unique nesting of the parts which the arrangement affords so as to be protected by a cover 66 (shown in dotted lines in Fig. 1) that can be secured in place by screws threading into openings 67 readily provided in the outer ends of plates 30 and have its sides extend far enough down to prevent accidental injury to the contact springs and armature.

The mechanical balance of the armature prevents operation by vibration or shock. This mechanical balance, as well as the magnetical balance, may be readily obtained by the structure disclosed herein. The mated heel pieces having portions extending upwardly between the coils and the yoke carried by these portions provide an assembly for the armature that will secure this novel feature of armature balance. The scope of the invention in this regard need not be limited to the specific structure shown as long as this desirable feature is employed.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to us by the following claims.

We claim:

1. In an electromagnetic relay, a pair of spaced magnetic cores each having an energizing winding thereon, a heel piece for each core, said heel pieces being substantially of identical magnetic capacity throughout and having portions lying between said cores and windings and being positioned opposite to one another, and a sub-assembly carried by said heel portions, said sub-assembly including a yoke, and armature and a bracket, said bracket carrying said armature, and a pair of upstanding ears on said bracket for pivotally mounting said bracket and said armature upon said yoke.

2. In an electromagnetic relay, a pair of spaced magnetic cores each having an energizing winding thereon, a heel piece for each core, said heel pieces having portions lying between said cores and windings and being positioned opposite to one another, and a sub-assembly carried by said heel portions, said sub-assembly including a yoke, an armature and a bracket, said bracket carrying said armature, and a pair of upstanding ears on said bracket for pivotally mounting said bracket and said armature upon said yoke.

3. In an electromagnetic relay, a pair of spaced magnetic cores each having an energizing winding thereon, a heel piece for each core, said heel pieces having portions lying between said cores and windings and being positioned opposite one another, and a sub-assembly carried by said heel portions, said sub-assembly including a yoke, an armature and a bracket carrying said armature, and a pair of upstanding ears on said bracket for pivotally mounting said bracket and said armature upon said yoke, the axis of the pivotal mounting lying substantially midway of and above said cores.

4. In an electromagnetic relay, a pair of spaced magnetic cores each having an energizing winding thereon, a heel piece for each core, said heel pieces having portions lying between said cores and windings and being positioned opposite one another, a yoke extending upwardly from opposite sides of said heel portions above said cores, an armature disposed above said cores, means for pivotally mounting said armature upon said yoke, a plurality of contact springs carried by said yoke above said armature, said heel pieces, yoke and armature being so constructed and arranged as to comprise a part of magnetic circuits for each core and its winding that balance each other upon a flow of current substantially of the same potential through the windings, said pivotal mounting holding said armature in a balanced position keeping said contact springs in open circuit position but causing said armature to be attracted to the core of the winding of increased potential when the balanced current flow is changed whereby to move certain of said contact springs to circuit closing position.

5. In an electromagnetic relay, a pair of spaced magnetic cores each having an energizing winding thereon, a heel piece for each core, said heel pieces having portions lying between said cores and windings and being positioned opposite one another, a yoke extending upwardly from opposite sides of said heel portions above said cores, an armature disposed above said cores, means for pivotally mounting said armature upon said yoke, a plurality of contact springs carried by said yoke above said armature, said heel pieces, yoke and armature comprising a part of a magnetic circuit for each core and its winding that holds said armature in a balanced open circuit position with respect to said spring contacts when current flows through said windings, said pivotal mounting being disposed to allow sad armature to be attracted to one of said cores when the current flow in one winding changes with respect to the other winding whereby to move certain of said contact springs to circuit closing position.

6. In an electromagnetic relay, a pair of spaced magnetic cores each having an energizing winding thereon adapted to provide balanced magnetic circuits between said cores, said magnetic circuits including heel pieces for each core, an armature and means for pivotally mounting said armature above said cores and in a pivotally balanced position with respect to both cores, said heel pieces being identical with respect to each other and provided each with a base and a vertical arm, each vertical arm having a transversely positioned lug along one edge and a cut-away portion along the other edge, said vertical arms abutting each other with their bases extending in opposite directions, the lug of one vertical arm lying across the cut-away portion of the other arm, said lugs receiving said pivotal mounting means of said armature.

7. In an electromagnetic relay, a pair of spaced magnetic cores each having an energizing winding thereon adapted to provide balanced magnetic circuits between said cores, said magnetic circuits including heel pieces for each core, an armature and a yoke member for pivotally mounting said armature above said cores and in a pivotally balanced position with respect to both cores, said heel pieces being identical with respect to each other and provided each with a base and a vertical arm, each vertical arm having a transversely positioned lug along one edge and a cut-away portion along the other edge, said vertical arms abutting each other with their bases extending in opposite directions, the lug of one vertical arm lying across the cut-away portion of the other arm, said yoke having equal portions extending downwardly about said sides of said vertical arms and being equally positioned with respect to each vertical arm, and means for attaching said yoke portions to said lugs.

CARL P. CLARE.
GEORGE WEINREICH.

REFERENCES CITED

The following references are of record in the file of this patent:

UNITED STATES PATENTS

| Number | Name | Date |
| --- | --- | --- |
| 724,366 | Wood | Mar. 31, 1903 |
| 1,559,110 | Leddick | Oct. 27, 1925 |
| 1,562,646 | Kaisling | Nov. 24, 1925 |
| 1,825,238 | Mishelevich | Sept. 29, 1931 |
| 2,096,419 | Altfather | Oct. 19, 1937 |
| 2,208,225 | Nelsen et al. | July 16, 1940 |
| 2,219,157 | Zenner | Oct. 22, 1940 |
| 2,307,077 | Reagan | Jan. 1, 1943 |